Figure 1:
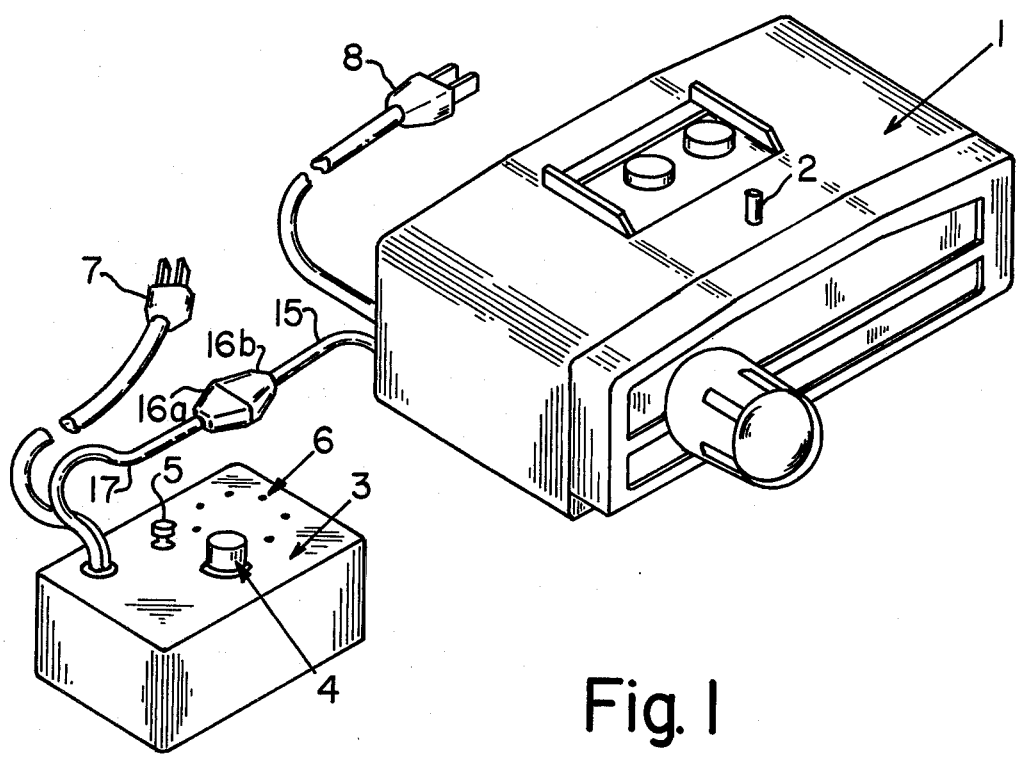

United States Patent [19]
Bryant

[11] 3,920,319
[45] Nov. 18, 1975

[54] SOUND SENSOR AND ADAPTER
[75] Inventor: Richard W. Bryant, State College, Pa.
[73] Assignee: Nova Productions, Inc., Butler, Pa.
[22] Filed: Oct. 4, 1974
[21] Appl. No.: 512,348

[52] U.S. Cl. ............... 352/39; 352/131; 352/169; 352/174; 352/179; 273/105.1
[51] Int. Cl.² ................................. G03B 19/18
[58] Field of Search ............ 352/39, 131, 169, 174, 352/179; 273/105.1

[56] References Cited
UNITED STATES PATENTS

| | | |
|---|---|---|
| 1,075,894 | 10/1913 | Bates et al. .................. 352/39 X |
| 1,125,661 | 1/1915 | Corbin et al. .................. 273/105.1 |
| 1,328,275 | 1/1920 | Franklin .................. 352/39 X |
| 3,411,785 | 11/1968 | Molina .................. 273/105.1 |

*Primary Examiner*—Monroe H. Hayes
*Attorney, Agent, or Firm*—Webb, Burden, Robinson & Webb

[57] ABSTRACT

A stop action circuit for freezing a motion picture frame upon a screen until a reset is actuated, comprising a projection adapter including a solenoid, a solenoid circuit, a relay circuit having an electronic switch therein and a transducer circuit sensitive to audible reports for opening the electronic switch.

2 Claims, 3 Drawing Figures

SOUND SENSOR AND ADAPTER

This invention relates to a stop action circuit for actuating a solenoid or the like in response to an audible report. The stop action circuit has particular application to marksmanship training systems involving projecting a movie image on a backstop having a disposable paper screen. The films may be re-enactments of actual incidents which a law enforcement officer would, for example, encounter during his duties, or which a hunter would experience in the woods. In response to the incidents portrayed, the trainee may or may not fire his weapon at the image upon the screen. The report of the weapon, in a system according to this invention stops the movie projector, freezing the scene on the screen and enabling the trainee to determine whether or not he hit the mark selected.

A stop action system for such a training system requires that the stop action circuit be responsive only to a sharp audible report and not to voices, shouts or simple foot shuffling and that it maintain the action stopped until a reset is actuated. It is also necessary that the sensitivity of the stop action circuit be adjustable for the particular environment in which the training system is being used. It is further desirable to utilize an adapter which can be installed on existing projectors and which is compatible with the stop action circuit. Previous attempts to marry a sound sensor to a projector to stop the film in response to a sharp report have been less than satisfactory as a result of inadequacies in both the circuit and the mechanical linkage associated with the projector.

Briefly, a movie projector is provided with a sound sensor and adapter which actuate the stop action mechanism of the projector to stop or remove the film driving means. When the stop action device is actuated through a signal from a sound sensor, a single movie picture frame is projected.

According to this invention, the stop action circuit of the sound sensor comprises (1) a first circuit including a relay switch in series with an AC solenoid and a plug connectable to an AC power source, (2) a second circuit including a DC power supply, a normally closed reset switch, the coil of the relay switch and the anode and cathode circuits of an electronic switch in series, and (3) a third circuit including a transducer suitable for detecting sharp audible report and converting it to an electrical signal, amplifiers for amplifying the transducer signal, an adjustable attenuating device for adjusting the sensitivity of the stop action circuit and the base circuit of an electronic switch. The DC power supply in the second circuit is arranged to provide the appropriate bias and collector voltages for the amplifiers in the third circuit. The solenoid is a part of an adapter which connects to the projector and which removes the driving sprocket from the film by means of a mechanical linkage.

The transducer, in operation, detects a sharp report creating an electric pulse which is amplified and presented at the gate of the electronic switch. The switch is thereby caused to enter its conducting mode. Current then flows in the relay coil causing the relay switch to close. The relay switch remains closed until the reset switch is opened enabling the electronic switch to return to its nonconducting mode. While the relay switch is closed the solenoid is activated, thus stopping the projector.

Figure 2:
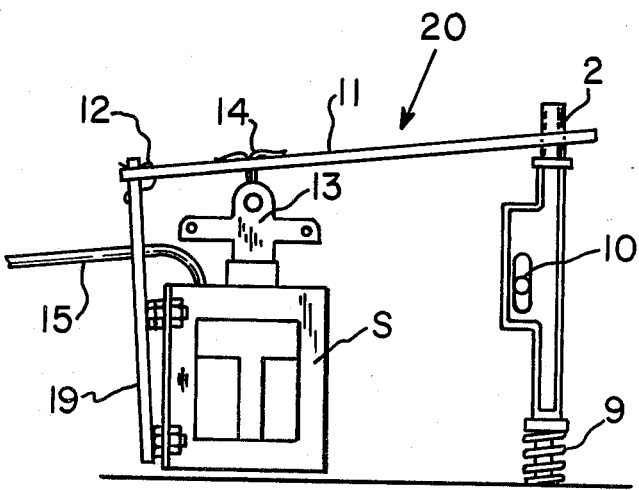
Figure 3:
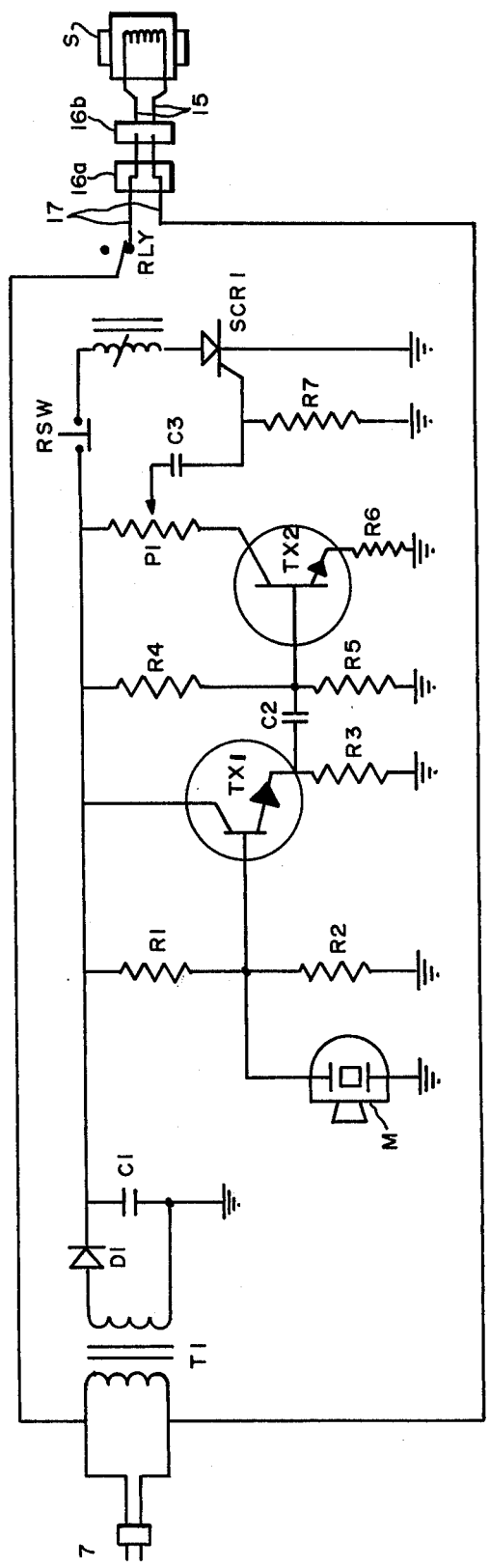

Further features and other objects and advantages of this invention will become clear from the following detailed description made with reference to the drawings in which:

FIG. 1 demonstrates the general relationship between the movie projector and the stop action device;

FIG. 2 illustrates the adapter in which a solenoid is used with a mechanical linkage to actuate the stop action lever of the projector; and FIG. 3 is a schematic of the electrical circuitry for the stop action circuit.

Referring now to FIG. 1, there is shown a movie projector 1 of the type having a stop action device actuated by a depressible shaft 2. Movie projectors, as shown in FIG. 1, are commercially available and the details of the projector other than those set forth herein are not a part of this invention. Associated with the projector 1 is a stop action circuit (sound sensor) enclosed in a housing 3 and an adapter, generally designated 20, which is mounted directly to the projector 1, FIG. 2.

The housing 3 in the particular embodiment shown in FIG. 1 has extending therefrom a sensitivity adjustment knob 4 and a reset button 5. The casing is provided with a number of openings 6 behind which a transducer M is mounted. Both the projector 1 and the stop action circuit are arranged to operate from 120 volts AC current, available in wall sockets. Plugs 7 and 8, respectively, are provided for that purpose.

Referring now to FIG. 2, the depressible shaft 2 of the projector 1 is arranged to be biased upwardly by a spring 9. When the shaft 2 is depressed against the bias, it carries a lever 10 downwardly, thus actuating the mechanical stop action apparatus associated with the projector, for example, the removal of the drive sprocket from the film slots, not shown.

The adapter 20 which is connected to the projector and more particularly to the mechanical stop action apparatus includes the solenoid S and a mechanical linkage. A lever arm 11 is pivotally mounted at 12 to a stationary arm 19 which in turn is bolted to the AC solenoid S. The other end of lever arm 11 is attached to the depressible shaft 2. Solenoid plunger 13 is arranged to move vertically within the solenoid S and is fixed to the lever arm 11 at 14 intermediate the ends thereof. Hence, when the solenoid S is actuated, the plunger 13 is pulled downwardly, rotating the lever arm 11 with it and thereby forcing the depressible shaft 2 downwardly carrying therewith the actuating arm 10 of the stop action mechanism of the projector. The adapter 20 can be installed on existing equipment and presently, at most, the biasing spring 9 is substituted for by a less resistant spring. The solenoid S is actuatable by 120 volts AC current supplied to it by cord 15 which connects the adapter 20 to the sound sensor, i.e. the stop action circuit. Cord 15 is arranged to connect the plug 16a and socket 16b to a cord 17 extending from the casing 3 of the stop action circuit.

Referring now to FIG. 3, which is a schematic diagram of the electrical circuitry of the stop action circuit, there is shown a plug 7 for providing AC power via the stop action circuit to the AC solenoid S. The plug and the solenoid S are in a series circuit including the switch of relay RLY. The relay RLY is normally open such that the solenoid is normally not actuated.

In parallel with the solenoid circuit is the primary of transformer T1. The secondary of the transformer T1 is part of a halfwave rectifying circuit which, as shown in FIG. 3, comprises a diode D1 and a filtering capacitor C1. These comprise a DC power supply. The rectifying circuit is in series with a reset switch RSW, the coil of the relay RLY and the anode and cathode on an electronic switch, for example, a silicon controlled rectifier (SCR1). The SCR1 is normally in a nonconducting mode and therefore normally no current flows through the coil of the relay RLY.

A trigger circuit comprises a microphone or transducer M for detecting a sharp audible report and converting it to an electric pulse. The output of the transducer M is supplied to the base of the transistor TX1 which is the first stage of a two-stage solid state amplifier. R1 and R2 are resistors forming a bridge to provide the appropriate bias at the base of the transistor TX1. R3 is a load resistor for transistor TX1 arranged in the emitter follower configuration. The output of transistor TX1 is capacitively coupled through C2 to the base of transistor TX2. Resistors R4 and R5 form a bridge for supplying an appropriate bias voltage to the base of transistor TX2. Potentiometer P1 and resistor R6 are the load resistors for the second transistor TX2. The output of the second transistor is capacitively coupled through C3 to the gate of the SCR1. Resistor R7 is arranged between the gate and ground as is typical in SCR circuits. Potentiometer P1 enables the sensitivity of the stop action circuit to be adjusted.

An audible report actuates the transducer M creating a pulse which is amplified (by transistors TX1 and TX2) and provides a signal at the gate of the SCR causing it to enter its conducting mode. At this time, a direct current will continue to flow from the DC power supply through the coil of the relay and through the anode and cathode of the SCR. Current will remain flowing until the reset switch RSW breaks the circuit. The reset switch RSW is actuated by depressing the reset button 5. Current flowing through the coil of the relay switch will close the relay directing AC current to the AC current solenoid S thereby actuating the stop action mechanism of the projector basically as described with reference to FIG. 2.

Sensitivity knob 4 adjusts the potentiometer P1 such that the electronic switch is only activated by a sharp audible report and not simply by conversation or foot shuffling. In this way, the circuit is adaptable to numerous environments.

Having thus described my invention with the detail and particularity required by the patent laws, what is desired protected by Letters Patent is set forth in the following claims:

1. In combination a sound sensor and an adapter actuated thereby suitable for installation on a movie projector, the adapter including a solenoid S having a solenoid plunger actuated thereby and a mechanical linkage connected between the plunger and a mechanical stop action means of the projector, the sound sensor comprising a first circuit having a relay switch RLY in series with the solenoid S and a plug P connectable to an AC power source; a second series circuit including a rectifier or DC power supply circuit, a normally closed reset switch RSW and a coil of relay RLY and an anode and cathode of an electronic switch (SCR); and a third circuit comprising a transducer suitable for detecting a sharp audible report and converting it to an electrical signal, amplifiers for amplifying said signal and an adjustable attenuation device for adjusting the sensitivity of the stop action circuit and the gate circuit of the electronic switch SCR such that when the transducer detects a sharp report, the pulse at the gate of the electronic switch (SCR) causes it to enter its conducting state and thereby permits a continuous DC current to pass through the relay switch RLY thereby holding it closed for passing current to the solenoid until the normally closed reset switch RSW is opened, the mechanical linkage comprising a lever arm pivotably connected at one end to a support and at a second end to the mechanical stop action means, said plunger being pivotably connected to the lever arm intermediate its ends.

2. The combination of claim 1 wherein the support comprises a support arm rigidly connected to the solenoid.

* * * * *